(12) United States Patent
Eom

(10) Patent No.: US 6,452,202 B1
(45) Date of Patent: Sep. 17, 2002

(54) APPARATUS FOR MEASURING LEVEL OF LIQUID IN TANK

(75) Inventor: Yoon-seop Eom, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/465,263

(22) Filed: Dec. 17, 1999

(30) Foreign Application Priority Data

Dec. 17, 1998 (KR) .............................................. 98-55749

(51) Int. Cl.$^7$ .............................................. G01N 21/53
(52) U.S. Cl. ...................... 250/574; 250/577; 73/293; 356/436; 340/619
(58) Field of Search ................................. 250/573, 574, 250/577, 900, 227.1; 73/290 R, 293; 356/436; 340/619; 399/57

(56) References Cited

U.S. PATENT DOCUMENTS

| | | | |
|---|---|---|---|
| 2,588,672 A | * 3/1952 | Turvey | 250/557 |
| 3,468,604 A | 9/1969 | Matkovich et al. | 355/10 |
| 3,713,338 A | * 1/1973 | Kind | 73/293 |
| 4,107,993 A | * 8/1978 | Shuff et al. | 73/290 R |
| 5,689,290 A | * 11/1997 | Saito et al. | 347/7 |
| 5,765,994 A | * 6/1998 | Barbier | 417/12 |

FOREIGN PATENT DOCUMENTS

| | | | |
|---|---|---|---|
| DE | 33 08 695 A1 | 9/1984 | G01F/9/00 |
| JP | 59-50472 | 3/1984 | G03G/15/10 |
| JP | 60-169720 | 9/1985 | G01F/23/28 |
| JP | 7-110254 | 4/1995 | G01F/23/14 |

OTHER PUBLICATIONS

Japanese Abstract No. 60169720, dated Sep. 3, 1985.
Japanese Abstract No. 07110254, dated Apr. 25, 1995.
Japanese Abstract No. 59050472, dated Mar. 23, 1984.

* cited by examiner

*Primary Examiner*—Stephone Allen
*Assistant Examiner*—Eric Spears
(74) *Attorney, Agent, or Firm*—Sughrue Mion, PLLC

(57) ABSTRACT

An apparatus for measuring the level of liquid contained in a tank includes a tank, at least one exhaust pipe having a transparent portion, a light source for emitting light to the transparent portion of the at least one exhaust pipe, a photodetector for detecting light reflected by or transmitted through the transparent portion of the at least one exhaust pipe and outputting electric signals corresponding to the detected light, and a liquid level measuring portion for measuring the level of liquid contained in the tank from the electric signals output from the photodetector. The transparent portion of the at least one exhaust pipe has one end thereof installed to be connected to the tank and the other end, horizontally extended a predetermined length from the one end, connected to a set supply path and/or the tank so that liquid can be collected. The exhaust pipe is installed at a predetermined height vertically from a bottom surface of the tank to obtain information on the level of liquid contained in the tank. Thus, developer can be prevented from adhering to the transparent portion of the exhaust pipe installed at the tank at the height to be measured so that an error in measuring the level of the liquid can be reduced.

8 Claims, 3 Drawing Sheets

APPARATUS FOR MEASURING LEVEL OF LIQUID IN TANK

BACKGROUND OF THE INVENTION

1. Field of the Invention

The present invention relates to an apparatus for measuring the level of a liquid in a tank adopted in a liquid electrophotographic printer and, more particularly, to an apparatus for measuring the level of a liquid in a tank adopted in a liquid electrophotographic printer so that an error in measuring the level of a liquid due to solidification of developer can be reduced.

2. Description of the Related Art

An apparatus for measuring the level of a liquid contained in a tank is adopted in a liquid electrophotographic printer such as a laser printer or a copier using developer to provide information about the amount of developer remaining in the tank. The liquid electrophotographic printer informs a user to add developer at an appropriate time by displaying a message requesting refilling of the developer using information on the amount of remaining developer provided by the liquid level measuring apparatus. Thus, by requesting a supply of developer appropriately by means of the liquid level measuring apparatus, an incomplete print process or interruption of a print task during printing due to a lack of developer can be avoided.

FIG. 1 shows the structure of a general liquid electrophotographic printer. Referring to the drawing, a printer using developer includes a plurality of rollers 11, 12 and 13, a photoreceptor web 14, a reset unit 15, four laser scanning units 16, four development units 30, a drying unit 18, and a transfer unit 20.

The reset unit 15 includes an exposure unit 15a for emitting light to the photoreceptor web 14 to remove an electrostatic latent image, and a charging unit 15b for charging the photoreceptor web 14 to a predetermined electric potential. Reference numeral 39 denotes a waste developer collection tank.

The four laser scanning units 16 scan information of yellow (Y), magenta (M), cyan (C) and black (B) colors. The four development units 30 supply developer of yellow (Y), magenta (M), cyan (C) and black (B) colors.

Each of the development units 30 includes a developer supply tank 32 for supplying developer to the photoreceptor web 14 and a development tank 31 for collecting developer falling from the photoreceptor web 14. Each development tank 31 includes a development roller 36, a brush roller 37 for removing developer adhering to the development roller 36, a squeegee roller 34 for separating a liquid carrier component of the developer supplied to the photoreceptor web 14 which is not used for image formation, and a plate 35 for collecting the carrier component flowing along the outer circumferential surface of the squeegee roller 34 into the development tank 31.

The developer supply tank 32 is provided with a liquid carrier component, norpar (N), which is a solvent, and toner which is a development substance, or highly concentrated developer from a developer supply portion 38 and is provided with the developer from the development tank 31. The developer contained in the developer supply tank 32 is supplied between the development roller 36 and the photoreceptor web 14 by a pump P.

In the printing process of the liquid electrophotographic printer having the above structure, the laser scanning unit 16 scans light onto a predetermined area of the photoreceptor web 14 circulating past the reset unit 15. An electrostatic latent image is formed on the photoreceptor web 14 by the scanned light and the electrostatic latent image is developed by developer supplied from the developer supply tank 32 of the development unit 30. A color image is formed on the photoreceptor web 14 by the laser scanning units 16 for scanning light of different color information and the development units 30 for performing development with developer of a corresponding color. Most of the liquid carrier component that is not used for image development of the developer supplied to the photoreceptor web 14 from the development unit 30 during development is collected in the development tank 31. As the photoreceptor web 14 continues to rotate, the color image formed on the photoreceptor web 14 with toner which is a development substance is first transferred to a transfer roller 21 rotating in engagement with the photoreceptor web 14, after passing the drying unit 18 for absorbing and removing the liquid carrier component remaining on the photoreceptor web 14. Subsequently, the image on the transfer roller 21 is transferred to a sheet of paper 23 by the rotation of the transfer roller 21 and the fixation roller 22 which rotate in engagement with each other interposing the paper 23 inserted therebetween and make the paper 23 proceed.

There is a conventional apparatus for measuring the level of developer contained in the developer supply tank 32 by detecting the change in the amount of transmitted or reflected light with respect to the developer supply tank 32. The liquid level measuring apparatus includes a light source (not shown) for emitting light at the height corresponding to the level of liquid to be measured with respect to the developer supply tank 32, and a photodetector (not shown) for detecting light which is transmitted or the reflected light in a direction which is the same as or opposite to the light projecting direction with respect to the developer supply tank 32. The developer supply tank 32 is made of a material such as plastic in order to prevent easy breakage. However, most developer supply tanks made of plastic have a strong affinity to the developer. As a result, an error occurs in the measurement of the level of liquid due to developer adhering to an inner wall of the plastic developer supply tank without a change in the liquid level.

As another example of the liquid level measuring apparatus, a float (not 15 shown) installed in a tank and a sensor (not shown) for detecting the amount of the positional displacement of the float. For example, a permanent magnet is built-in the float and a Hall sensor responding to a magnetic force is adopted. In such a liquid level measuring apparatus, a movement path having a width slightly greater than the outer diameter of the float is vertically installed at the tank to minimize the rate of the positional displacement of the float in the horizontal direction with respect to a vertical movement path of the float. However, in this case, the width of the movement path of the float can be less than the outer diameter of the float due to the developer fixedly adhering to the tank so that an error can occur in measuring the level of liquid. Also, the float must be manufactured according to the specific gravity of the developer subject to the test, which is inconvenient.

Meanwhile, there is another method of measuring the level of liquid by installing two electrode plates (not shown) in a tank and detecting the change in electrostatic capacitance measured by the electrode plates corresponding to the change in the level of the developer. However, in this method, when the developer fixedly adheres to the electrode plate, an error can occur in measuring the level of liquid.

SUMMARY OF THE INVENTION

To solve the above problems, it is an objective of the present invention to provide an apparatus for measuring the level of liquid contained in a tank which can reduce fixing of developer to the position where the level of liquid is measured so that an error in measuring the level of liquid can be reduced.

Accordingly, to achieve the above objective, there is provided an apparatus for measuring the level of a liquid contained in a tank, which comprises a tank, at least one exhaust pipe including a transparent portion in at least a part thereof, having one end thereof installed to be connected to the tank and the other end, horizontally extended a predetermined length from the one end, connected to a set supply path and/or the tank so that liquid can be collected, said exhaust pipe being installed at a predetermined height vertically from a bottom surface of the tank to obtain information on the level of the liquid contained in the tank, a light source for emitting light to the transparent portion of the at least one exhaust pipe, a photodetector for detecting light reflected by or transmitted through the transparent portion of the at least one exhaust pipe and outputting electric signals corresponding to the detected light, and a liquid level measuring portion for measuring the level of the liquid contained in the tank from the electric signals output from the photodetector.

It is preferable in the present invention that the transparent portion is a glass pipe, and that the other end of the exhaust pipe is connected to a developer supply pipe through which the developer contained in the tank can be supplied to a photoreceptor medium.

Also, it is preferable in the present invention that, the at least one exhaust pipe comprises a first exhaust pipe. installed at a predetermined height from the bottom surface of the tank to provide information on a low level of liquid, a second exhaust pipe installed at a height higher than that of the first exhaust pipe to provide information on a medium level of liquid, and a third exhaust pipe installed at a height higher than that of the second exhaust pipe to provide information on a full level of liquid.

BRIEF DESCRIPTION OF THE DRAWINGS

The above objective and advantages of the present invention will become more apparent by describing in detail a preferred embodiment thereof with reference to the accompanying drawings, in which.

DETAILED DESCRIPTION OF THE INVENTION

Figure 1:
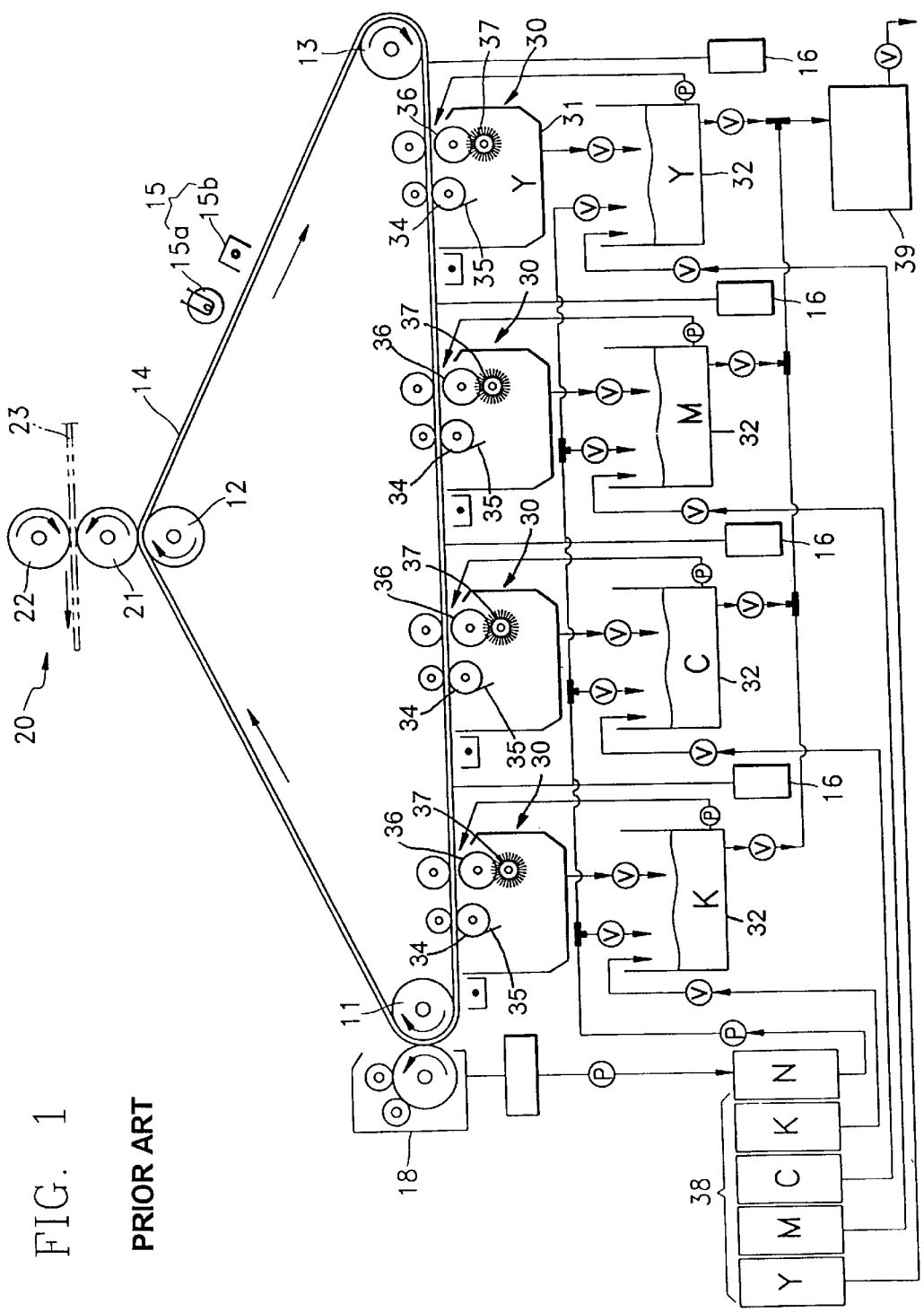
FIG. 1 is a view showing the structure of a general liquid electrophotographic printer.

In the description below, elements having the same functions as those described in FIG. 1 are labeled with the same reference numerals.

Figure 2:
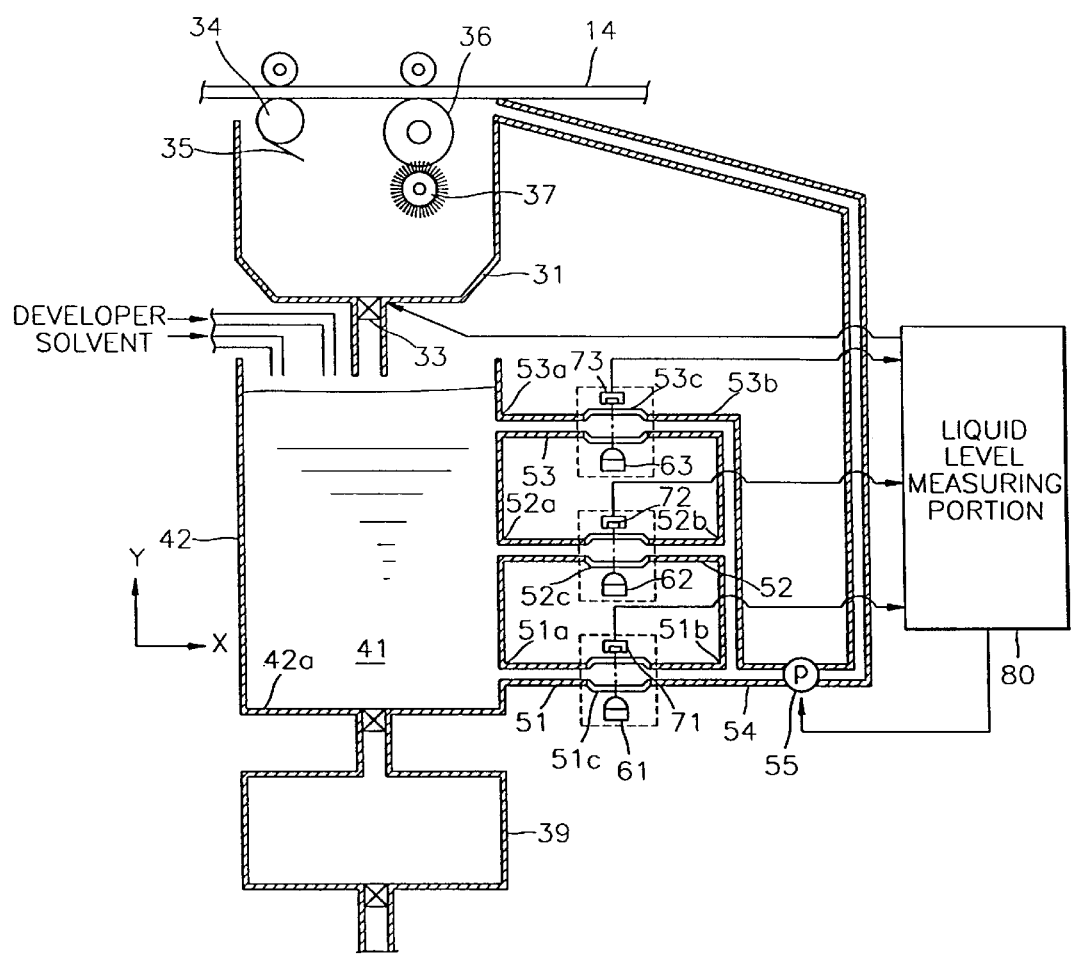
FIG. 2 is a sectional view showing a part of a liquid electrophotographic printer adopting an apparatus for measuring the level of liquid in a tank according to the present invention.

Referring to FIG. 2, a first exhaust pipe 51, a second exhaust pipe 52 and a third exhaust pipe 53 are sequentially installed along the horizontal direction (direction X) on a side surface of a developer supply tank 42 at predetermined intervals upward (direction Y) from a bottom surface 42*a* of the developer supply tank 42. End portions 51*a*, 52*a* and 53*a* of the first, second and third exhaust pipes 51, 52 and 53, respectively, are connected to the developer supply tank 42 and the other end portions 51*b*, 52*b* and 53*b* thereof are connected to a developer supply pipe 54. The first, second and third exhaust pipes 51, 52 and 53 are provided with transparent portions 51*c*, 52*c* and 53*c*, respectively, a part of or the entire part of which is formed of a transparent material, preferably, a glass tube exhibiting the features of having a low affinity to the developer 41 and making the developer 41 being easily separated therefrom as liquid flows.

A pump 55 is provided for supplying the developer 41 in the developer supply tank 42 to the photoreceptor web 14 which is a photoreceptor medium.

When the other end portions 51*b*, 52*b* and 53*b* of the first, second and third exhaust pipes 51, 52 and 53 are connected to the developer supply pipe 54 as described above, the developer 41 is exhausted toward the developer supply pipe 54 through the first, second and third exhaust pipes 51, 52 or 53 located below the level of the developer 41 contained in the developer supply tank 42 by being driven by the pump 55 during printing. Thus, it is advantageous that the developer 41 does not easily adhere to the transparent portions 51*c*, 52*c* and 53*c*.

The positions of the first, second and third exhaust pipes 51, 52 or 53 from the bottom surface 42*a* of the developer supply tank 42 are appropriately determined according to the level of the developer 41 to be checked.

In the case in which only an empty state, a supplement requiring state and a full state according to the amount of developer 41 remaining are needed, as shown in the drawing, the first, second and third exhaust pipes 51, 52 or 53 are installed at the set heights for a low level, a mid level and a full level. The transparent portions 51*c*, 52*c* and 53*c* of the first, second and third exhaust pipes 51, 52 or 53 are respectively provided with light sources 61, 62 and 63 and photodetectors 71, 72 and 73 for receiving light rays emitted from the light sources 61, 62 and 63 and passing the transparent portions 51*c*, 52*c* and 53*c*. The photodetectors 71, 72 and 73 may be installed to be operative to receive light rays emitted from the light sources 61, 62 and 63 and reflected by the transparent portions 51*c*, 52*c* and 53*c*.

Figure 3:
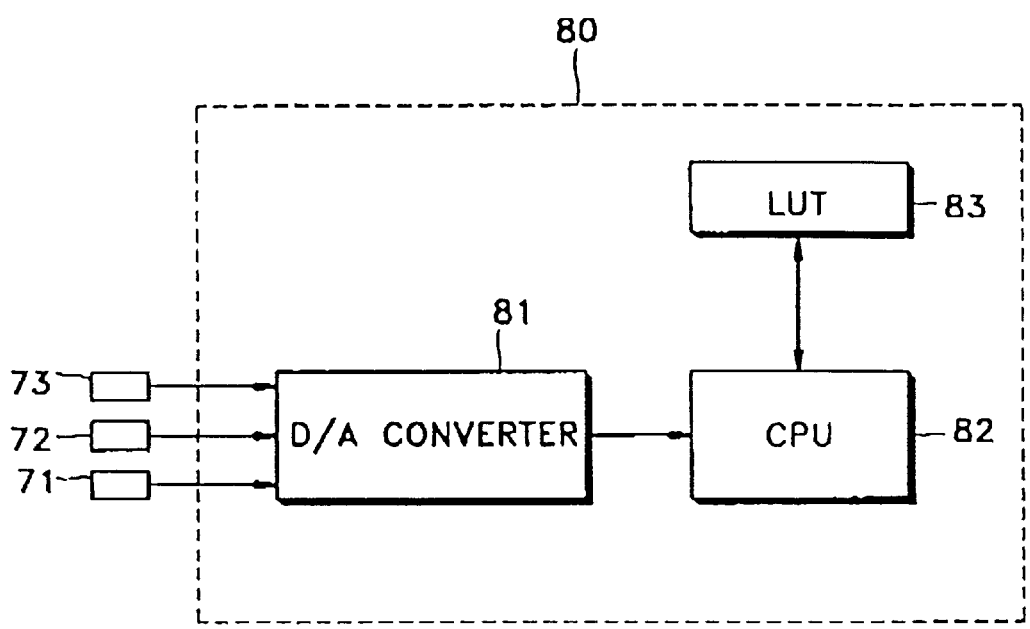
FIG. 3 shows a preferred structure of the liquid level measuring portion 80.

A liquid level measuring portion 80 receives electric signal levels output from the respective photodetectors 71, 72 and 73 installed to face the transparent portions 51*c*, 52*c* and 53*c* of the first, second and third exhaust pipes 51, 52 or 53 and compares the received electric signal levels with data, obtained through experiments for the cases in which the transparent portions 51*c*, 52*c* and 53*c* are full, partially filled and completely empty, and recorded therein, so that the level of the developer 41 can be measured. FIG. 3 shows a preferred structure of the liquid level measuring portion 80. In FIG. 3, the D/A converter 81 converts the analog signal output from the photodetectors 71, 72 and 73 into digital signals. In the LUT 83, the liquid level values of the developer 41 corresponding to the digital data output from the D/A converter 81 are recorded. Therefore, the CPU 82 measures the level of the developer 41 from the digital data output from the D/A converter 81 by using the LUT 83.

In the process of measuring the level of liquid by the liquid level measuring apparatus having the above structure, first, the liquid level measuring portion 80 controls a valve 33 provided on an exhaust pipe between the development tank 31 and the developer supply tank 42 to open periodically or at an appropriate time to restrict the developer 41 from adhering to the first, second and third exhaust pipes 51, 52 or 53. Then, the liquid level measuring portion 80 drives the pump 55 so that the developer 41 in the developer supply tank 42 is preferably circulated to be collected after passing through the developer supply pipe 54 and the development tank 31. Here, as an example of driving the pump 55 at an appropriate time, the pump 55 is driven for a predetermined time when, in a print ready state in which a print job is not performed, the level of developer 41 contained in the developer supply tank 42 is maintained as high as one of the first, second and third exhaust pipes 51, 52 or 53 and a corresponding signal is input from the photodetector 71, 72 or 73.

When the developer 41 is circulated in a print ready state, the developer 41 can be prevented from adhering to the transparent portions 51c, 52c and 53c of the first, second or third exhaust pipes 51, 52 or 53. Also, the level of the developer 41 contained in the developer supply tank 42 can be measured from signals output from the photodetectors 71, 72 and 73 during or after a developer circulating process.

When an electric signal corresponding to a state in which the developer 41 in the developer supply tank 42 is lowered below the first exhaust pipe 51 is input from the photodetector 71 installed at the first exhaust pipe 51, the liquid level measuring portion 80 controls the developer supply portion (38 of FIG. 1) such that highly concentrated developer and/or a liquid carrier component can be supplied from the developer supply portion.

The liquid level measuring apparatus as above can be adopted to any type of tank capable of containing liquid and supplying the contained liquid through a predetermined path.

As described above, according to the apparatus for measuring a level of liquid in a tank according to the present invention, developer can be prevented from adhering to the transparent portion of the exhaust pipe installed at the tank at the height to be measured so that an error in measuring the level of liquid can be reduced.

It is contemplated that numerous modifications may be made to the apparatus for measuring level of liquid in tank of the present invention without departing from the spirit and scope of the invention as defined in the following claims.

What is claimed is:

1. An apparatus for measuring the level of a liquid contained in a tank, comprising:

a tank;

at least one exhaust pipe including a transparent portion in at least a part thereof, having one end thereof installed to be connected to the tank and the other end, horizontally extended a predetermined length from the one end, connected to a set supply path, said exhaust pipe being installed at a predetermined height vertically from a bottom surface of the tank to obtain information on the level of the liquid contained in the tank;

a pump, disposed in the supply path so as to circulate liquid from said tank through said exhaust pipe;

a light source for emitting light to the transparent portion of the at least one exhaust pipe;

a photodetector for detecting light reflected by or transmitted through the transparent portion of the at least one exhaust pipe and outputting electric signals corresponding to the detected light; and a liquid level measuring portion for measuring the level of the liquid contained in the tank from the electric signals output from the photodetector.

2. The apparatus as claimed in claim 1, wherein the transparent portion comprises a glass pipe.

3. The apparatus as claimed in claim 1, wherein the other end of the at least one exhaust pipe is connected to a developer supply pipe through which developer contained in the tank can be supplied to a photoreceptor medium.

4. The apparatus as claimed in claim 1, wherein said at least one exhaust pipe comprises a first exhaust pipe installed at a predetermined height from the bottom surface of the tank to provide information on a low level of liquid, a second exhaust pipe installed at a height higher than that of the first exhaust pipe to provide information on a medium level of liquid, and a third exhaust pipe installed at a height higher than that of the second exhaust pipe to provide information on a full level of liquid.

5. The apparatus as claimed in claim 4, wherein the other end of the first exhaust pipe is connected to the developer supply pipe through which the developer contained in the tank can be supplied to a photoreceptor medium.

6. The apparatus as claimed in claim 4, wherein the other ends of the second and third exhaust pipes are connected to the developer supply pipe.

7. The apparatus as claimed in claim 4, wherein the other ends of the first, second and third exhaust pipes are connected to one another.

8. The apparatus as claimed in claim 1, wherein said set supply path is connected back to said tank so that liquid can be recirculated to said tank.

* * * * *